United States Patent
Moser et al.

(10) Patent No.: US 11,279,054 B2
(45) Date of Patent: Mar. 22, 2022

(54) NON-SLIP RULER FOR MEASURING, MARKING AND/OR CUTTING FABRICS AND OTHER SOFT MATERIALS AND METHOD THEREOF

(71) Applicants: Ramon Eduardo Moser, Lake Mary, FL (US); Adriana Kaye, Altamonte Springs, FL (US); Beatriz Moser, Lake Mary, FL (US)

(72) Inventors: Ramon Eduardo Moser, Lake Mary, FL (US); Adriana Kaye, Altamonte Springs, FL (US); Beatriz Moser, Lake Mary, FL (US)

(73) Assignee: Beehive Company LLC, Lake Mary, FL (US)

( * ) Notice: Subject to any disclaimer, the term of this patent is extended or adjusted under 35 U.S.C. 154(b) by 406 days.

(21) Appl. No.: 16/298,642

(22) Filed: Mar. 11, 2019

(65) Prior Publication Data

US 2020/0290229 A1     Sep. 17, 2020

(51) Int. Cl.
    *G01B 3/04*      (2006.01)
    *G01B 3/00*      (2006.01)
    *B26B 29/06*     (2006.01)
    *D06H 7/00*      (2006.01)
    *B26B 25/00*     (2006.01)

(52) U.S. Cl.
    CPC .............. *B26B 29/06* (2013.01); *G01B 3/002* (2013.01); *G01B 3/04* (2013.01); *B26B 25/005* (2013.01); *D06H 7/00* (2013.01)

(58) Field of Classification Search
    CPC ......... B26B 29/06; B26B 25/005; G01B 3/04; G01B 3/002; D06H 7/00; A41H 31/00
    USPC ............................................................. 33/484
    See application file for complete search history.

(56) References Cited

U.S. PATENT DOCUMENTS

| | | | | |
|---|---|---|---|---|
| 5,471,749 A * | 12/1995 | Brady | ..................... | B26B 29/06 33/484 |
| 5,615,488 A * | 4/1997 | Brady | ..................... | B26B 29/06 33/484 |
| 6,314,653 B1 * | 11/2001 | Iso | ............................. | B43L 7/00 33/484 |
| 6,606,796 B2 * | 8/2003 | Stoneberg | ................. | B43L 7/10 33/27.03 |
| 7,032,319 B2 * | 4/2006 | Ollgaard | .................. | B43L 7/00 33/483 |
| 7,043,850 B2 * | 5/2006 | Brady | ..................... | G01B 3/002 33/11 |
| 7,503,124 B2 * | 3/2009 | Hobden | ................... | G01C 9/02 33/451 |

(Continued)

*Primary Examiner* — Yaritza Guadalupe-McCall
(74) *Attorney, Agent, or Firm* — Albert Bordas, P.A.

(57) ABSTRACT

A device for measuring and cutting soft materials, wherein the device has a lower section and an upper section, the lower section having a bottom surface and a top surface, and at least one opening extending from the top surface to the lower surface. Bendable means on the upper section, and at least one piercing object carried by the bendable means, wherein the bendable means bends in response to a downward force applied to it, causing the piercing means to move through the opening and engage the soft material, said bendable means being self-retracting so that it returns to a natural resting position when the force ceases to exist, causing the piercing object to disengage from the soft material.

14 Claims, 5 Drawing Sheets

(56) References Cited

U.S. PATENT DOCUMENTS

| | | | | |
|---|---|---|---|---|
| 7,958,646 | B2* | 6/2011 | So | B43L 12/00 33/484 |
| 10,391,656 | B2* | 8/2019 | Oey | G01B 3/04 |
| 2002/0095804 | A1* | 7/2002 | Coplan | B25H 1/0078 33/484 |
| 2004/0049935 | A1* | 3/2004 | Tandy | D05B 97/12 33/563 |
| 2007/0175052 | A1* | 8/2007 | Schafer | B26B 29/06 33/1 B |
| 2007/0214671 | A1* | 9/2007 | Campagna | B43L 7/007 33/492 |
| 2009/0025245 | A1* | 1/2009 | Brady | B26B 29/06 33/562 |
| 2011/0088270 | A1* | 4/2011 | So | B43L 7/005 33/484 |
| 2012/0311877 | A1* | 12/2012 | Manohar | B25H 7/04 33/18.1 |
| 2018/0001498 | A1* | 1/2018 | Oey | G01B 1/00 |
| 2020/0290229 | A1* | 9/2020 | Moser | B26B 29/06 |

* cited by examiner

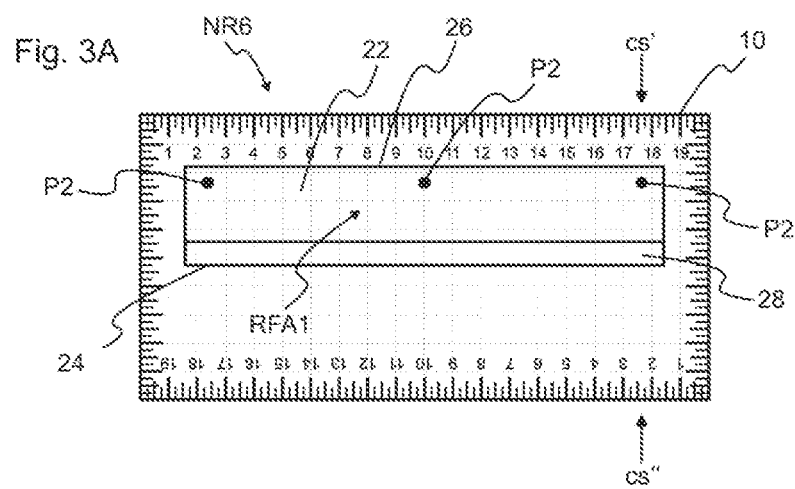
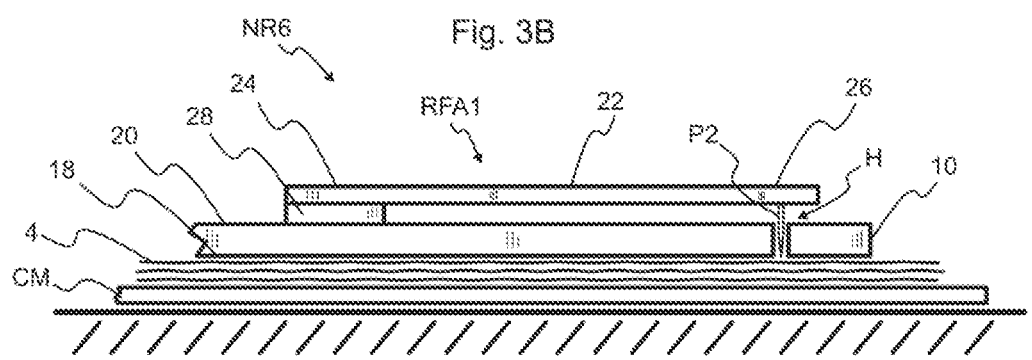
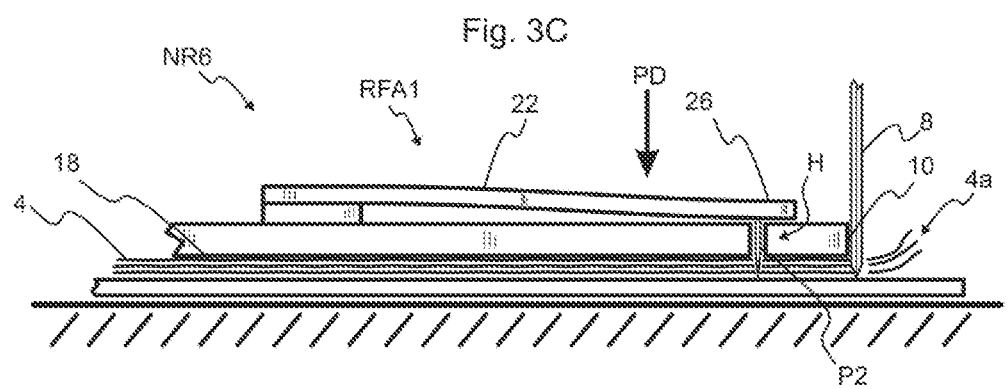

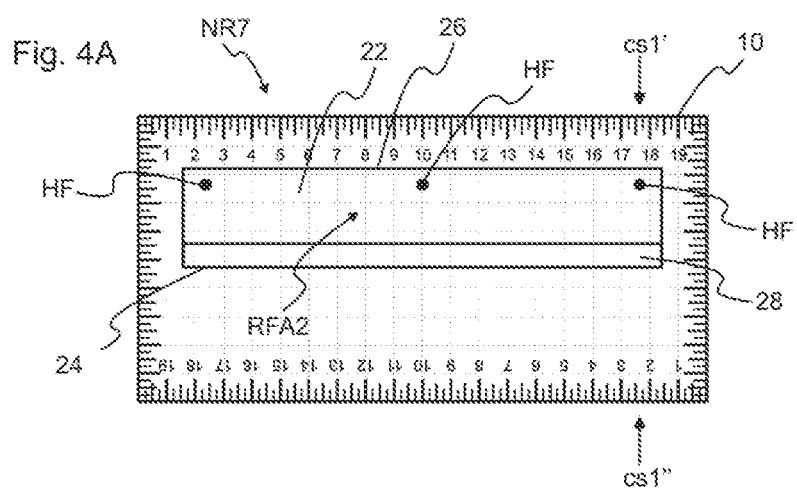
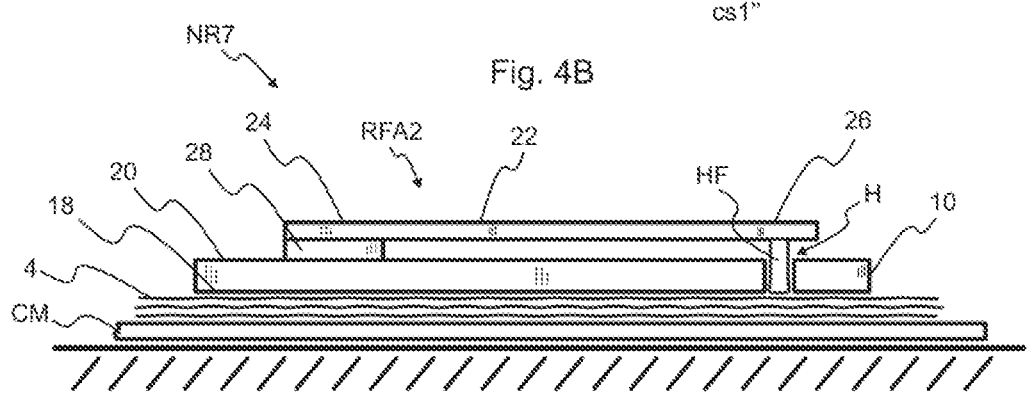
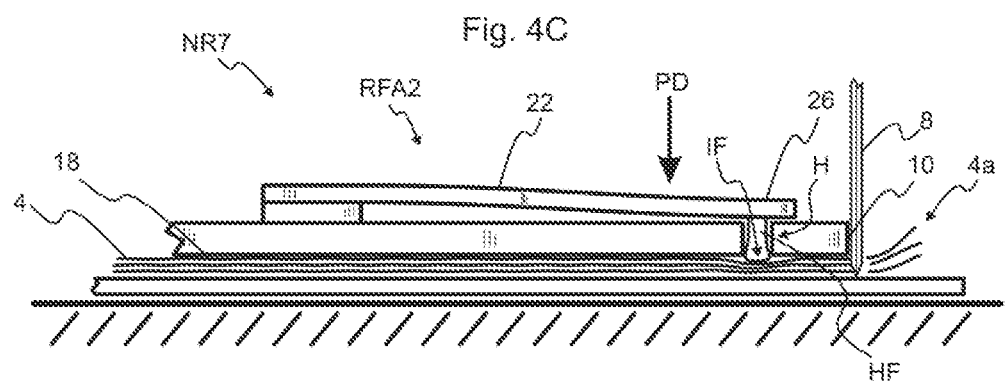

NON-SLIP RULER FOR MEASURING, MARKING AND/OR CUTTING FABRICS AND OTHER SOFT MATERIALS AND METHOD THEREOF

This application claims the benefit of provisional application Ser. No. 62/644,566, filed Mar. 18, 2018.

TECHNICAL FIELD

The present invention relates to a ruler for measuring, marking and/or cutting soft materials such as paper and fabrics. The invention is a simple device that can be used to secure any ruler to a piece of fabric using commonly found needles, pins and the like. More specifically, the invention is a non-slip ruler which has at least one spike designed to penetrate one or more layers of fabric in order to prevent the ruler from moving undesirably on the fabric.

Even more specifically, the present invention discloses self-retracting bendable means to enable the non-slip ruler to engage and disengage soft materials without the need of moving parts like hinges, guides or springs.

BACKGROUND ART

The activity of quilting is very popular. People from many different nations do it on a regular basis for leisure and business alike. It involves creating a patchwork and stitching it in a pattern called a quilt with another piece of fabric, usually including additional filing material between the patchwork and the fabric.

People began creating patchworks as long as thousands of years ago when they would use leftover pieces of leather to make clothing, bedding, and even armor. Commonly, the patchwork is an essential part of a quilted product such as bed covers, blankets, cushions, etc.

To create a handmade patchwork, a person sews together several relatively small pieces of fabric of many different shapes, sizes and colors, which involves using rulers and cutting tools such as rotary cutters to cut a large number of pieces of fabric.

Therefore, the activity of creating a patchwork is somewhat confined to individuals since the great variety in shapes and sizes of patches does not provide an easy method of mass production. This means that a person will have to manually measure and cut a large number of relatively small pieces of fabric.

Quilting rulers, used for making many small pieces or patches of material, should slide easily on top of fabrics so the user can position the ruler quickly and easily on the right place to cut the fabric, which will be a repeated action in order to create many patches of fabric. However, this can become a problem since it is very important that the ruler does not move from the desired place and angle when making a cut.

Therefore, to ensure a proper cut, the person using conventional rulers must make quite an effort and press hard on the ruler against the fabric in order to keep the ruler from moving while cutting the fabric. This problem becomes even more acute when the person, in order to save time, desires to cut several layers of fabric in one single cut. Keeping the ruler from moving while making this kind of cut makes the cut even more difficult, especially for an inexperienced user.

In summary, there are two problems to be considered:
The ruler should move easily on top of fabric when the person is choosing the place to cut the fabric, and
The ruler should not move at all when the person is doing the action of cutting the fabric.

This is where designers and manufactures of quilting rulers and tools have failed to solve the problem properly, since they have not realized the need for retractable means.

Even though the manufacturing industry of quilting tools and accessories is quite large, there has not been a significant improvement in rulers to solve the problems mentioned above.

Some attempts include a sticker-like patch, which adheres to the bottom of the ruler and increases the friction coefficient between the ruler and the fabric, making it somewhat easier for the person to hold the ruler in the right place. However, the ruler can still move undesirably, so the person still has to press the ruler hard against the fabric while cutting the fabric.

Moreover, even though the "sticker" is removable, it cannot be engaged and retracted at will in an instant, but instead stays attached to the ruler. Therefore, the ruler does not slide easily on top of the fabric, which makes it more difficult to position the ruler in the precise place for the next cut.

Other manufactures have decided to permanently cover the bottom of the ruler with a coating of a material with higher friction coefficient; however, this approach does not solve the problems mention below:
The friction coefficient is not high enough to absolutely prevent the ruler from moving undesirably when making a cut, and again;
With a coating permanently on the underside of the ruler, the ruler does not slide easily on top of the fabric, making it more difficult for the person to place the ruler precisely on the right spot for the next cut.

Therefore, with these approaches the user must sacrifice a portion of one benefit to obtain just a portion of the other benefit.

Even though the industry has invested quite heavily in research and development, up to now it has failed in finding a real solution to this problem. In other words, modern rulers constantly move and slide undesirably as the user is making a cut, resulting in wasted time, effort and materials.

DISCLOSURE OF THE INVENTION

The present invention is a retractable means having an increased friction coefficient. More specifically, the present invention is a ruler with a retractable means that when pressed against the fabric keeps the ruler from moving.

One embodiment of the present invention is a non-slip ruler with at least one needle-like spike mounted on retractable means. In this way, with the spike in the retracted position the user can slide the ruler with a very low friction coefficient freely on top of the fabric and pierce the fabric with the spike at will, whenever it is desired to set the non-slip ruler in a fixed position with respect to the fabric.

Another embodiment of the present invention comprises a non-slip ruler with at least one high friction coefficient element mounted on retractable means. In this way, with the high friction coefficient element in the retracted position, the user can slide the ruler freely on top of the fabric and engage the high friction coefficient element at will, thus increasing the friction coefficient between the ruler and the fabric to prevent the ruler from moving undesirably with respect to the fabric.

The increased friction coefficient retractable means disclosed herein serves two purposes:

(1) In the retracted position, the increased friction coefficient retractable means does not engage the fabric. Therefore, the ruler has a very low friction coefficient between the bottom surfaces of the ruler and the material underneath it. This allows the user to slide and move the ruler easily and unrestricted on top of fabrics, for example, just like any conventional ruler. This is a very desirable feature since this allows the user to place the ruler easily in the precise spot to cut the material.
(2) In the engaged position, the increased friction coefficient retractable means provides a strong grip between the bottom surfaces of the ruler and the material underneath it, which is a very desirable feature since this prevents the ruler from moving when the user is marking or cutting any soft materials such as papers or fabrics.

The retractable means of the present invention makes it possible to have these two features combined in one single ruler, providing the user with the best of the two worlds, i.e., easy to slide on top of any material and a strong grip when cutting the material.

The following steps are followed in using the present invention:

Step 1

Place the non-slip ruler on top of a fabric.

Step 2

Apply force and bend at least one section of the non-slip ruler until said one section is engaging the fabric. This secures said non-slip ruler to the fabric and, thus, prevents the non-slip ruler from moving undesirably on top of the fabric Step 3

Continue to apply force, keeping said one section bended and engaged to the fabric while using a cutting tool to cut the fabric along one edge of said non-slip ruler.

Step 4

Stop applying force to said one section of said ruler, allowing said one section bent to spring back to its original, natural shape and disengage the fabric.

This brings additional benefits:

The person does not have to make the big effort of pressing hard on the ruler to keep it from moving, which can be very tiring after a while. Moreover, even a greater advantage for the elderly who might suffer from joints pain, arthritis, etc.

The person can be relaxed, without any concern that the ruler is going to move undesirably as the person cuts the fabric, after all, quilting is supposed to be a relaxing activity.

There is not wasted time since every cut is done right the first time and not wasted materials since a flawed cut might ruin the piece being cut and the person has to use a new piece of fabric to try again to cut it right.

Moreover, one of the greatest benefits of all is that the retractable means allow the person to use the non-slip ruler in the same exact way as a conventional ruler. for example:

Push it sideways and the ruler will slide easily on top of the fabric;

Push it downward to make a cut on a piece of fabric, exactly as the person would do with a conventional ruler, and the Retractable Means engage the fabric and the ruler becomes firmly attached to the fabric;

Stop pushing downwards and the ruler easily slides sideways once again.

Even though the manufacturing industry of quilting tools and accessories is quite large, there has not been a significant improvement in rulers to solve the problems mentioned above.

Some attempts include a sticker-like patch, which adheres to the bottom of the ruler and increases the friction coefficient between the ruler and the fabric, making it somewhat easier for the person to hold the ruler in the right place. However, the ruler can still move undesirably, so the person still has to press hard the ruler against the fabric while cutting fabric.

Moreover, even though the "sticker" is removable it cannot be engaged and retracted at will in an instant but, instead, stays attached to the ruler, therefore the ruler does not slide easily on top of the fabric, which makes it somewhat more difficult to place the ruler on the precise place for the next cut.

Other manufactures decided to cover permanently the bottom of the ruler with a coating of a material with higher friction coefficient; however, this approach does not solve the two problems mention below:

The friction coefficient is not high enough to absolutely prevent the ruler from moving undesirably when making a cut and again;

With the material coated permanently, the ruler does not slide easily on top of the fabric, making it somewhat more difficult for the person to place the ruler precisely on the right spot for the next cut.

Therefore, with these approaches the user must sacrifice a portion of one benefit to obtain just a portion of the other benefit.

Even though the industry has invested quite heavily in research and development, up to now, it has failed in finding a real solution to this problem. In other words, modern rulers constantly move and slide undesirably as the user is making a cut, resulting in wasted time, effort and materials.

The real solution, object of the present invention, is to fix the ruler to the fabric with means that will absolutely prevent the ruler from moving undesirably with respect to the fabric, as shown in FIGS. 2*a*, 2*b*, 2*c* and 2*d* below.

In more elaborated embodiments, as shown in FIGS. 3 and 4, the increased friction coefficient retractable means of the invention solves both problems completely:

In one embodiment, retractable piercing means engage the fabric with one or more spikes that penetrate the fabric, making it practically impossible for the ruler to slide undesirably on top of the fabric without tearing it apart. However, in the retracted position, the user can slide the ruler on top of the fabric without any obstruction in order to place the ruler easily on the right place for the next cut.

In another embodiment, a material of extremely high friction coefficient, forming an integral part of the retractable means, engages the fabric in one or more points, making very difficult for the ruler to slide undesirably on top of the fabric. However, just like in the first embodiment mentioned above, in the retracted position, the user can slide the ruler on top of the fabric without any obstruction in order to place the ruler easily on the right place for the next cut.

Moreover, the non-slip ruler of the present invention allows any person to use it in the same exact way as a conventional ruler, without any additional movements or steps.

In order words, to cut fabric the user just has to press the ruler against the fabric, something that the person had to do with a conventional ruler, causing the retractable means to engage the fabric, which is a huge advantage compared to conventional rulers.

Then, the person stops pressing on the ruler after finishing cutting the fabric, also something that the person had to do with a conventional ruler, causing the retractable means to retract and disengage the fabric and allowing the person to move the non-Slip ruler easily on top of the fabric, just as a conventional ruler.

Therefore, any person can use and enjoy the non-slip ruler without any special training or performing any additional steps whatsoever.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIGS. 3A, 3B and 3C show a first alternate embodiment of the invention being used to cut fabric.

FIGS. 4A, 4B and 4C show a second alternate embodiment of the invention being used to cut fabric.

BEST MODE FOR CARRYING OUT THE INVENTION

Figure 1A:
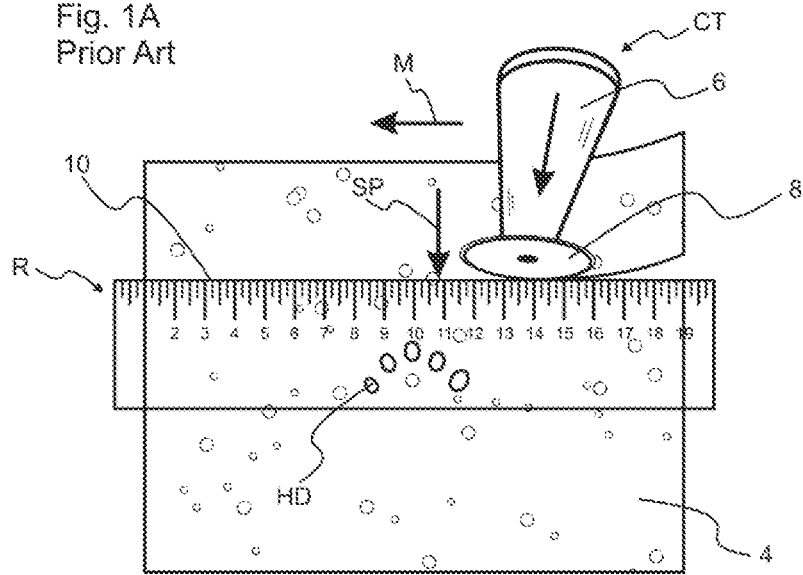
FIGS. 1A and 1B are top views of a cut being made without the advantage of the invention.
Figure 1B:
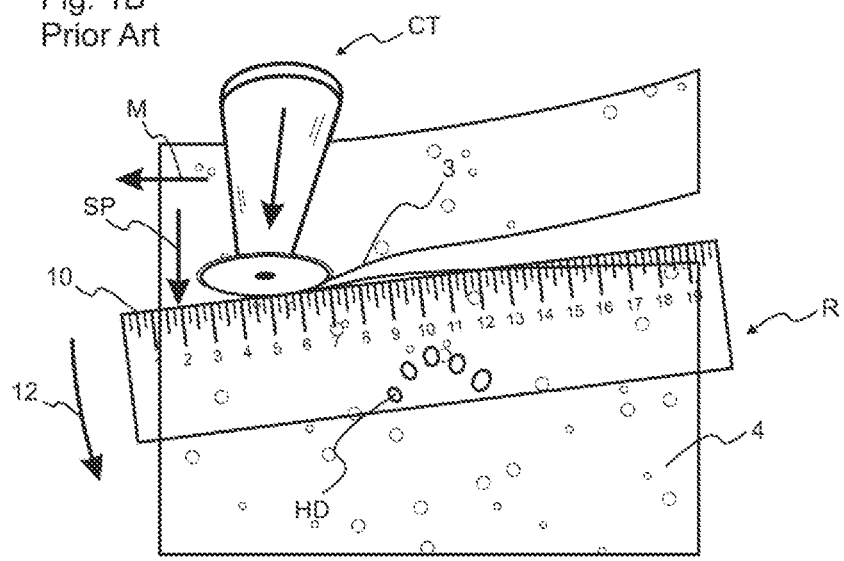

As shown in FIGS. 1A and 1B, to cut fabric 4 the user places ruler R on the desired spot and moves cutting tool CT, which, besides other components not shown, has a handle 6 and a cutting disk 8 that is moved along the ruler's edge 10, just like an employee would do to cut a pizza pie.

To hold the ruler R, the user places his or her hand HD to apply downward pressure on ruler R. There would be some side pressure SP as the cutting tool CT moves along the ruler's edge 10.

FIG. 1B shows the problem with conventional rulers. As cutting tool CT moves M away from the user's hand UH, side pressure SP can cause ruler R to slide sideways 12, resulting in an undesired cut 3 on fabric 4.

Due to this problem, the activity of cutting fabrics requires more effort since the user has to put more pressure on the ruler to keep it from moving, which can result in wasted time and materials. Moreover, in the prior art just a few layers of fabric can be cut at one time since more layers cut at once will increase the probabilities of the ruler moving undesirably.

FIGS. 2A, 2B, 2C and 2D show a non-slip ruler according to the invention that solves the problem mentioned above.

Figure 2A:
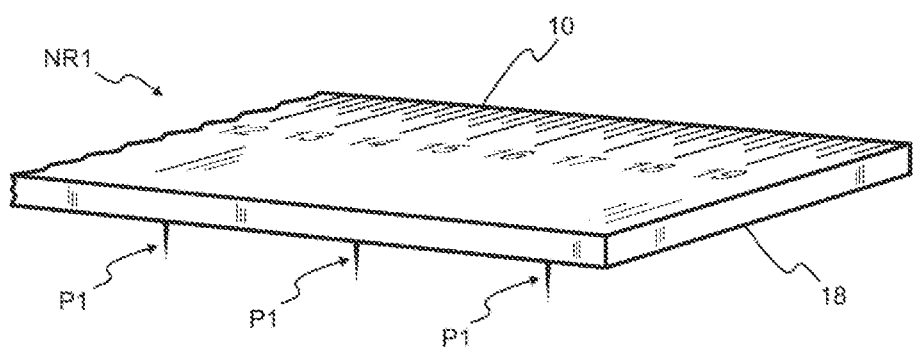
FIGS. 2A and 2B show a ruler having the features of the invention.
Figure 2B:
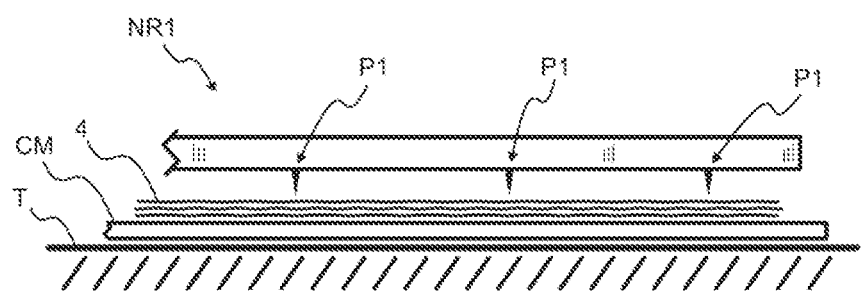

FIG. 2A is a top view showing a non-slip ruler NR1, which has three spikes P1 placed on the bottom surface 18 of the ruler in the example shown, The cross-sectional view of FIG. 2B shows how the user would get ready to cut multiple layers of fabric. The user places cutting mat CM on a table T, and in this example three layers of fabric 4. The user now places non-slip ruler NR1 on top of fabric 4, with spikes P1 facing the fabric 4.

Figure 2C:
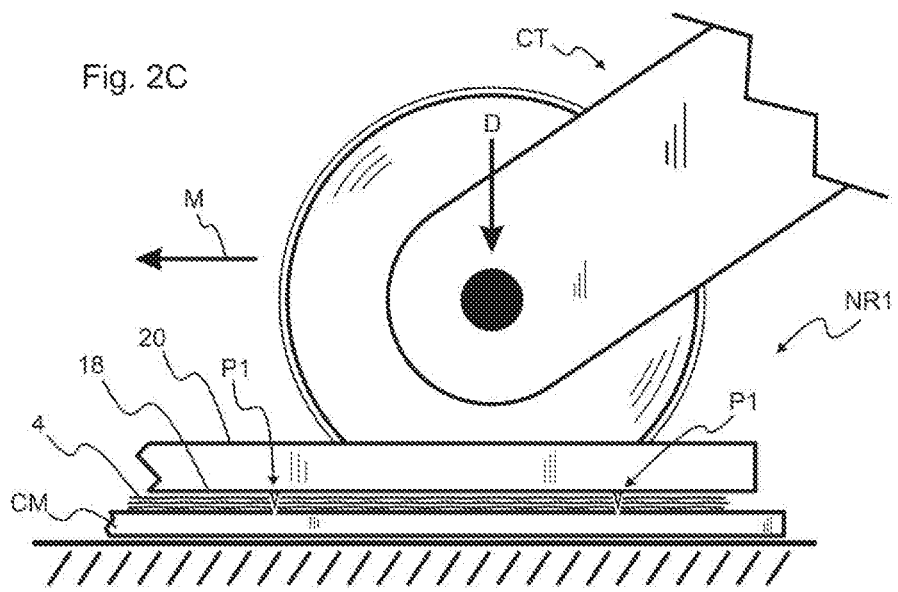
FIGS. 2C and 2D show one embodiment of the ruler of the invention being used to cut fabric.

In the cross-sectional view of FIG. 2C, the user proceeds to put pressure on the non-slip ruler NR1 top surface 20 until spikes P1 on the bottom surface 18 have pierced all three layers of fabric 4. In this way, the non-slip ruler NR1 will not move with respect to fabric 4. The user can now move M cutting tool CT along the ruler's edge 10 (shown in FIG. 2A), while putting downward pressure D on cutting tool CT to ensure that all layers of fabric 4 are cut correctly.

Figure 2D:
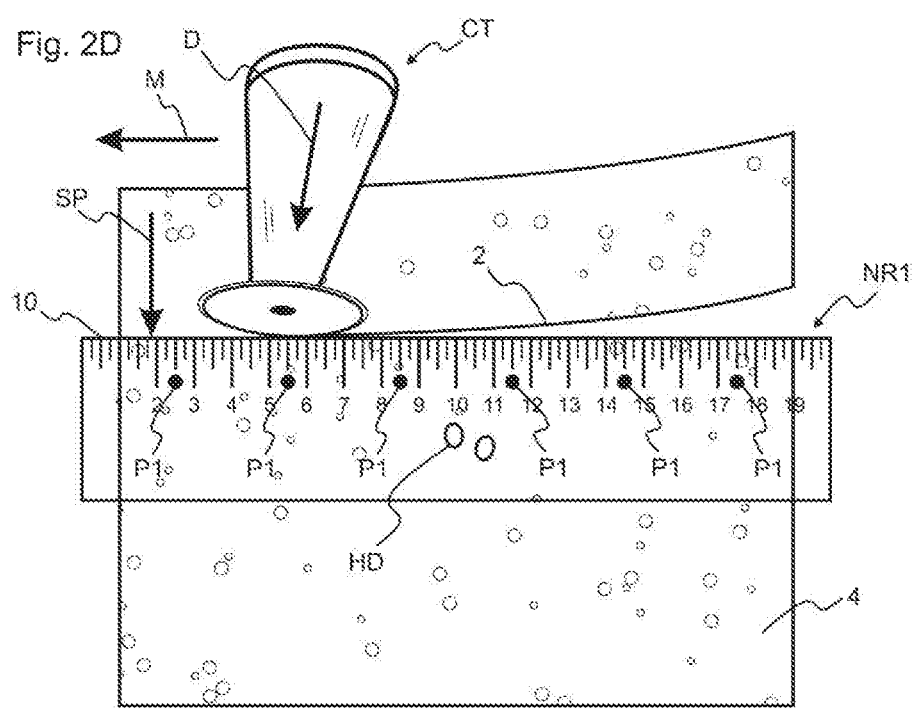

The top view of FIG. 2D shows how the cutting tool CT has moved M, passing the point where the user's hand UH is holding the non-slip ruler NR1.

Even though the user continues to put downward pressure D on the ruler, which inevitably would create side pressure SP on the ruler's edge 10, non-slip ruler NR1 will not move since spikes P hold the non-slip ruler NR1 in place with respect to fabric 4.

Therefore, the user can easily accomplish a flawless, desired cut 2 without wasting time, money and materials.

FIG. 3A is a top view of another embodiment NR6. In this embodiment, a retractable friction means assembly RFA1 has basically two elements: a flexible top element 22 and a spacer 28 that form an integral part of the non-slip ruler NR6. Flexible top element 22 is glued to spacer 28 on the portion adjacent to flexible top element back 24 and has three pins P2 mounted on flexible top element front 26 in close proximity to ruler edge 10.

FIGS. 3B and 3C are cross-section views of non-slip ruler NR6. (See FIG. 3A (cs1'-cs1")).

FIG. 3B shows retractable friction means assembly RFA1 mounted on the top surface 20 of non-slip ruler NR6. The bottom surface 18 sits on top of fabric 4 on cutting mat CM. Spacer 28 provides a space between flexible top element 22 and non-slip ruler NR6 top surface 20, and attaches flexible top element back 24 to top surface 20. Pin P2 in close proximity to ruler edge 10, is secured to flexible top element front 26 and extends downward through hole H without engaging fabric 4. In this figure non-slip ruler NR6 is in its natural state and can slide and move on top of fabric 4 unrestricted.

FIG. 3C shows how flexible top element 22 has bent down in response to user pushing down PD an area in close proximity to flexible top element front 26. This causes pin P2 to protuberate from hole H passed bottom surface 18 and pierce fabric 4 making it extremely difficult to move non-slip ruler NR6 with respect to fabric 4.

Now, the user can proceed to move rotary cutter disk 8 along ruler edge 10 to cut fabric 4a without having to make a big effort since flexible top element 22 is designed to bend easily, allowing pin(s) P2 to do the work of holding non-slip ruler NR6 on the desire place and angle.

The user, after cutting fabric 4a, stops pushing down PD on flexible top element 22, which will spring back to its original state (shown in FIG. 3B), causing pin P2 to disengage fabric 4 so user can move non-slip ruler NR6 freely, ready for the next cut.

FIG. 4A is a top view of another embodiment of non-slip ruler NR7. This figure shows retractable friction means assembly RFA2, which has basically two elements: flexible top element 22 and spacer 28 and forms an integral part of non-slip ruler NR7. Flexible top element 22 is glued to spacer 28 on the portion adjacent to flexible top element back 24 and has three high friction coefficient element HF mounted on flexible top element front 26 in close proximity to ruler edge 10.

FIGS. 4B and 4C are cross-section views of non-slip ruler NR7. (See FIG. 4A (cs1'-cs1")). FIG. 4B shows retractable friction means assembly RFA2 mounted on the top surface 20 of non-slip ruler NR7. Bottom surface 18 sits on top of fabric 4 on cutting mat (CM). Spacer 28 provides a space between flexible top element 22 and non-slip ruler NR7 top surface 20 and attaches flexible top element back 24 to top surface 20.

High friction coefficient element HF, in close proximity to ruler edge 10, is attached to the lower part of flexible top element front 26 and extends downward through hole H without engaging fabric 4. In this figure, non-slip ruler NR6 is in its natural state and can slide and move on top of fabric 4 unrestricted.

FIG. 4C shows how flexible top element 22 has bent down in response to the user pushing down PD an area in close proximity to flexible top element front 26. This causes high friction coefficient element HF to protrude from hole H past bottom surface 18 and engage fabric 4, increasing friction coefficient IF between the bottom surface 18 and fabric 4, thus making it extremely difficult to move non-slip ruler NR7 with respect of fabric 4.

Now, user can proceed to move rotary cutter disk 8 along ruler edge 10 to cut fabric 4a without having to make a big effort since flexible top element 22 is designed to bend easily, allowing high friction coefficient element HF to do the work of holding non-slip ruler NR7 on the desired place and angle.

The user, after cutting fabric 4a, stops pushing down PD on flexible top element 22, which will spring back to its original state (shown in FIG. 4B), causing high friction coefficient element HF to disengage fabric 4 so user can move non-slip ruler NR7 freely, ready for the next cut.

The novelty of the present invention is in the bending of the material, which makes it possible to engage and disengage the high friction means (metal pins, high friction silicone, etc.) without the need to use additional elements like hinges, guides, springs, etc.

In using the invention, a ruler is placed on the top surface of a piece of fabric. A force is then applied to bend at least one section of the ruler until that section engages the fabric. Force is continually applied to that section while keeping that section bent and engaged with the fabric while using a cutting tool to cut the fabric along one edge of the ruler. The user then stops applying force, permitting the bent section to spring back to its original, natural shape and disengage from the fabric.

While particular embodiments of the invention have been illustrated and described in detail herein, it should be understood that various changes and modifications may be made in the invention without departing from the spirit and intent of the invention as defined by the appended claims.

What is claimed is:

1. A non-slip ruler for measuring, marking and cutting fabrics and other soft materials, comprising:
   A) a bottom surface;
   B) a top surface;
   C) a ruler edge; and
   D) a retractable friction means assembly comprising a bendable top element and a spacer, said bendable top element comprises a bendable top element back and pins, said retractable friction means assembly is mounted on said top surface, wherein said spacer attaches said bendable top element back to said top surface, whereby said spacer provides a space between said bendable top element and said top surface.

2. The non-slip ruler for measuring, marking and cutting fabrics and other soft materials set forth in claim 1, wherein said bendable top element further comprises a bendable top element front.

3. The non-slip ruler for measuring, marking and cutting fabrics and other soft materials set forth in claim 2, wherein said pins are mounted on said bendable top element front.

4. The non-slip ruler for measuring, marking and cutting fabrics and other soft materials set forth in claim 2, wherein said bottom surface sits on top of a fabric.

5. The non-slip ruler for measuring, marking and cutting fabrics and other soft materials set forth in claim 4, wherein said pins are secured to said bendable top element front and extends downward through a hole without engaging said fabric.

6. The non-slip ruler for measuring, marking and cutting fabrics and other soft materials set forth in claim 5, wherein said bendable top element is bent down when a user pushing down an area in close proximity to said bendable top element front.

7. The non-slip ruler for measuring, marking and cutting fabrics and other soft materials set forth in claim 6, wherein when said user pushing down said area in close proximity to said bendable top element front, said pins protrude from said hole passing through said bottom surface and pierce said fabric making difficult the movement with respect to said fabric.

8. The non-slip ruler for measuring, marking and cutting fabrics and other soft materials set forth in claim 6, wherein when said user stops pushing down on said bendable top element, said spacer urges said bendable top element to spring back to an original state, whereby said pins disengage said fabric.

9. The non-slip ruler for measuring, marking and cutting fabrics and other soft materials set forth in claim 6, wherein when said pins disengage said fabric said user can move said non-slip ruler freely.

10. The non-slip ruler for measuring, marking and cutting fabrics and other soft materials set forth in claim 1, wherein said pins are mounted in close proximity to said ruler edge.

11. The non-slip ruler for measuring, marking and cutting fabrics and other soft materials set forth in claim 1, wherein said bendable top element comprises pins.

12. The non-slip ruler for measuring, marking and cutting fabrics and other soft materials set forth in claim 1, wherein said bendable top element is attached to said spacer.

13. The non-slip ruler for measuring, marking and cutting fabrics and other soft materials set forth in claim 1, wherein said bendable top element is attached to said spacer on a portion adjacent to said bendable top element back.

14. The non-slip ruler for measuring, marking and cutting fabrics and other soft materials set forth in claim 1, wherein said bendable top element bends, allowing said pins to hold said non-split ruler at a desired place and angle.

* * * * *